3,160,625
PROCESS FOR THE PREPARATION OF 2′,3′-ISO-PROPYLIDENE RIBONUCLEOSIDES
Osamu Simamura, Tokyo, Yoshio Tsuchiya, Kanagawa-ken, Tadao Takenishi, Tokyo, Tetusya Kato, Kana-gawa-ken, Hisao Mori, Tokyo, and Takashi Meguro, Kanagawa-ken, Japan, assignors to Ajinomoto Co., Inc., Tokyo, Japan
No Drawing. Filed Feb. 13, 1963, Ser. No. 258,354
Claims priority, application Japan, Aug. 29, 1961, 36/30,709
15 Claims. (Cl. 260—211.5)

This invention relates to a process for the preparation of 2′,3′-O-isopropylidene ribonucleosides, which are important starting materials for the synthesis of 5′-substituted ribonucleosides, such as 5′-ribonucleotides and compounds of the type of coenzyme A. 5′-substituted ribonucleosides are of interest not only to the biochemist but also to the food technologist. The sodium salts of naturally occurring purine 5′-ribonucleotides are known to have a pleasant meat-like flavor and are useful as seasonings.

The object of the invention is to provide a method of preparing 2′,3′-O-isoproylidene ribonucleosides in an economical manner on an industrial scale.

It is known to prepare 2′,3′-O-isopropylidene derivatives of ribonucleosides by reacting ribonucleosides with an excess of acetone in the presence of certain metal chlorides, particularly zinc chloride. The reaction is reversible and the N-glycoside is apt to hydrolyze in an acid medium. It is, therefore, necessary to perform the reaction in an anhydrous medium.

We have now found that the yield of the reaction betwen purine ribonucleosides, such as inosine, guanosine and adenosine, and acetone can be substantially increased and hydrolysis of the N-glycoside bond by a strongly acid catalyst can be substantially avoided when the reaction is performed in the presence of an alcohol. The desired end product may be recovered from the reaction mixture by merely neutralizing and partly evaporating the same.

When purine ribonucleosides are dissolved in acetone containing hydrogen chloride, only 20–30% of the starting material is recovered as the corresponding isoproylidene derivative and the rest is hydrolyzed to base and ribose. If the acetone contains an appreciable amount of alcohol, the yield is readily increased to as much as 90–94%.

The acid catalyst is preferably dissolved in the alcohol or in a portion of the alcohol prior to being added to the other constituents of the reaction mixture.

The time required for the reaction to go to completion is very short, of the order of 10 minutes at room temperature. If the reaction mixture is left to stand thereafter, the yield is not greatly affected since the rate of rupture of the N-glycoside bond is extremely low in the presence of the alcohol.

The acid catalysts effective in promoting the reaction between the purine ribonucleosides and acetone include all strong inorganic acids, such as hydrogen chloride, sulfuric acid and the like, and strong organic acids, such as organosulfonic acids. This group includes numerous acids which are readily available at low cost and thus make the process capable of being performed ecoomically on an industrial scale.

Alcohols effective in increasing the yield of 2′,3′-O-isopropylidene purine ribonucleosides beyond that available under otherwise similar conditions in the absence of such alcohols include many aliphatic and aromatic alcohols, including alkoxy alkanols, such as the several cellosolves and phenols. Ethanol and methanol are preferred alcohols for performing the process of the invention because of their availability at low cost and the excellent results obtained thereby. When alcohol and acetone are the only reagent used best results are generally obtained when the ratio of alcohol to acetone in the reaction mixture is near one, but yields far in excess of what has been achieved heretofore are readily obtained when the ratio of alcohol to acetone differs greatly from the optimum value. There is some correlation between the best ratio of alcohol to acetone and the amount of catalyst present, as will become apparent hereinafter. The optimum ratio of alcohol to acetone varies to some extent with the nature of the alcohol used.

It is a particular advantage of the process of the invention that any difference between the yield actually obtained and a yield of 100% is not due to secondary reactions leading to undesired compounds but to failure of the reaction to go to completion. The unreacted starting material may be recovered intact from the reaction mixture so that the yield in terms of converted purine ribonucleosides is not substantially different from 100% under all conditions of performing the process of the invention disclosed hereinafter for the purpose of illustrating the invention.

The reaction between purine ribonucleosides and acetone according to the invention may be performed at any temperature at which acetone is in the liquid state. For reasons of enonomy and convenience it is preferably performed between room temperature (that is, a temperature of 20–50°) and approximately 40° C. At lower temperatures and at higher temperatures, the yield is somewhat lower. The time required for the reaction reaches a minimum at approximately 30° C. The loss of product by disruption of the N-glycoside bond is insignificant if the reaction mixture is left to stand for even a prolonged period in the preferred temperature range.

To recover the 2′,3′-O-isopropylidene purine ribonucleosides from the reaction mixture, the pH of the mixture is adjusted to a value between 7 and 9, at which the nucleosides present are stable at elevated temperature. The volatile solvents are then distilled off and the residue is cooled. The 2′,3′-O-isopropylidene purine ribonucleosides crystallize as fine white powders.

The influence of process variables on the reaction according to the invention will be readily apparent from Tables I to IV. For ready correlation, 0.8 gram (3 millimoles) of inosine were employed in each test run. Unless specifically stated otherwise, the temperature of reaction was 27° C. Listed ratios of alcohols to acetone are volume ratios, ratios of catalysts to inosine are mole ratios. Yields of the isopropylidene inosine formed are reported in terms of percent of initially present inosine.

Table I

| Run No. | Acetone, ml. | Ethanol, ml. | Ratio Eth. to Ac. | Catalyst | Ratio Catal. Inos. | Yield, percent, After— 15 min. | Yield, percent, After— 30 min. |
|---|---|---|---|---|---|---|---|
| 1 | 7.5 | 7.9 | 1.05 | Hydrogen chloride | 1 | 0 | 0 |
| 2 | 7.5 | 8.3 | 1.10 | do | 2 | 11 | 15 |
| 3 | 7.5 | 8.7 | 1.16 | do | 3 | 47 | 52 |
| 4 | 7.5 | 9.1 | 1.21 | do | 4 | 80 | 85 |
| 5 | 7.5 | 9.5 | 1.27 | do | 5 | 91 | 93 |
| 6 | 7.5 | 9.9 | 1.32 | do | 6 | 91 | 91 |
| 7 | 7.5 | 10.2 | 1.36 | do | 8 | 94 | 93 |
| 8 | 7.5 | 10.9 | 1.45 | do | 10 | 92 | 90 |
| 9 | 7.5 | 9.5 | 1.27 | do | 5 | 91 | 93 |
| 10 | 7.5 | 9.2 | 1.23 | do | 5 | | 93 |
| 11 | 7.5 | 5.5 | 0.73 | do | 5 | | 90 |
| 12 | 7.5 | 3.6 | 0.48 | do | 5 | | 90 |
| 13 | 7.5 | 1.7 | 0.23 | do | 5 | 91 | 88 |
| 14 | 30.0 | 1.7 | 0.06 | do | 5 | | 64 |
| 15 | 7.5 | 9.9 | 1.32 | do | 6 | 91 | 91 |
| 16 | 7.5 | 7.4 | 0.99 | do | 6 | 91 | 88 |
| 17 | 7.5 | 4.9 | 0.65 | do | 6 | 89 | 89 |
| 18 | 15.0 | 18.3 | 1.22 | do | 10 | 95 | 93 |
| 19 | 7.5 | 7.5 | 1.000 | p-Toluene-sulfonic acid | 5 | | 67 |
| 20 | 7.5 | 7.5 | 1.000 | Phosphoric acid anhydride | 5 | | 65 |
| 21 | 15.0 | 15.0 | 1.000 | Sulfuric acid | 5 | 64 | 80 |
| 22 | 15.0 | 15.0 | 1.000 | do | 10 | 87 | 86 |

Table II

[7.5 ml. of methanol were employed in all runs, and the catalyst was hydrogen chloride]

| Run No. | Acetone, ml. | Ratio methanol to acetone | Ratio catalyst to inosine | Yield, percent After— 10 min. | Yield, percent After— 30 min. |
|---|---|---|---|---|---|
| 1 | 7.5 | 1 | 5 | 86 | 5 |
| 2 | 7.5 | 1 | 6 | 87 | 85 |
| 3 | 7.5 | 1 | 8 | 90 | 89 |
| 4 | 5.0 | 1.5 | 10 | 91 | 85 |

Table III

[7.5 ml. acetone and 7.5 ml. alcohol were employed in all runs. Hydrogen chloride was employed as the catalyst]

| Run No. | Alcohol | Ratio of catalyst to inosine | Yield, percent, after— 15 min. | Yield, percent, after— 30 min. |
|---|---|---|---|---|
| 1 | Methanol | 5 | 86 | |
| 2 | do | 6 | 87 | 85 |
| 3 | do | 8 | 90 | 89 |
| 4 | iso-Propanol | 6 | 93 | 90 |
| 5 | n-Butanol | 6 | 93 | 88 |
| 6 | Ethyl-cellosolve | 6 | 89 | 83 |
| 7 | Benzyl alcohol | 6 | 86 | |

Table IV

[7.5 ml. acetone, and 9.7 ml. ethanol were employed in all runs. Hydrogen chloride was the catalyst and was used at a ratio of 5.5 with respect to the inosine reacted]

| Run No. | Temp., °C. | Yield, percent, after— 15 min. | Yield, percent, after— 30 min. |
|---|---|---|---|
| 1 | 10-1 | 42 | 45 |
| 2 | 10-1 | 85 | 94 |
| 3 | 30-1 | 88 | 93 |
| 4 | 40-1 | 90 | 90 |
| 5 | 50-1 | 80 | 74 |

We have also found that a further improvement in the yield between a purine ribonucleoside and acetone in the presence of a strong acid catalyst is possible when a 2,2-dialkoxypropane is present in addition to the alcohol. A similar increase in yield is observed in the presence of a lower alkylorthoformate. Under the conditions of the process of this invention, 2,2-dialkoxypropanes are in equilibrium with corresponding orthoformates according to the following equation:

$$(CH_3)_2CO + HC(OR)_3 \xrightarrow{H^+} (CH_3)_2C(OR)_2 + HCOOR$$

The effect of the presence of 2,2-diethoxy propane on the reaction of inosine with acetone to form 2',3'-O-isopropylidene inosine is apparent from the results of test runs tabulated in Table V. In these test runs, 0.2 gram inosine were reacted with acetone at room temperature for fifty minutes in the presence of ethanol, a strong acid catalyst and 2,2-diethoxy propane.

Table V

| Run No. | Acetone, ml. | Ethanol, ml. | 2,2-diethoxy propane, g. | Catalyst | Ratio catalyst to inosine | Yield, percent |
|---|---|---|---|---|---|---|
| 1 | 1.75 | 1.75 | 0.8 | Hydrogen Chloride | 2 | 99 |
| 2 | 1.75 | 1.75 | 0.8 | do | 3 | 98 |
| 3 | 3.50 | 3.50 | 1.2 | do | 6 | 94 |
| 4 | 3.50 | 3.50 | 0.2 | do | 6 | 97 |
| 5 | 1.75 | 1.75 | 0.8 | Sulfuric acid | 5 | 97 |

The analogous effects of ethylorthoformate (EOF) are illustrated by Table VI which lists results of additional test runs. In these test runs, 0.4 gram inosine were reacted with acetone and ethylorthoformate (EOF) in the presence of hydrochloric acid and ethanol at room temperature for 15 minutes.

*Table VI*

| Run No. | Acetone, ml. | Ethanol, ml. | Moles per mole inosine | | Yield, percent |
|---|---|---|---|---|---|
| | | | EOF | HCl | |
| 1 | 3.8 | 3.8 | 1 | 5 | 84 |
| 2 | 3.8 | 3.8 | 2 | 5 | 97 |
| 3 | 3.8 | 3.8 | 3 | 5 | 97 |
| 4 | 3.8 | 3.8 | 4 | 5 | 98 |
| 5 | 3.8 | 3.8 | 5 | 5 | 98 |
| 6 | 3.8 | 3.8 | 6 | 2 | 97 |
| 7 | 3.8 | 3.8 | 6 | 3 | 98 |
| 8 | 3.8 | 3.9 | 6 | 4 | 99 |
| 9 | 3.8 | 3.8 | 6 | 10 | 98 |
| 10 | 1.9 | 1.9 | 6 | 10 | 98 |
| 11 | 0.8 | 0.8 | 6 | 10 | 98 |

Not only purine ribonucleosides but also other natural ribonucleosides, such as uridine or cytidine, may be converted into their 2',3'-O-isopropylidene derivative with almost quantitative yields by the method of the invention as is evident from Table VII. The table lists results of reactions performed at room temperature in 30 minutes, with the exception of Run No. 3 which was permitted to proceed for 60 minutes.

The several nucleosides were employed in respective amounts of 0.1 gram. Acetone and ethanol were present in the reaction mixtures in amounts of 0.94 milliliters each.

*Table VII*

| Run No. | Nucleoside | Moles per mole nucleoside | | Yield of isopropylidene derivative, percent |
|---|---|---|---|---|
| | | EOF | HCl | |
| 1 | Guanosine | 6.3 | 5.3 | 87 |
| 2 | Adenosine | 6.0 | 5.1 | 99 |
| 3 | Cytidine | 6.0 | 5.0 | 95 |
| 4 | Uridine | 6.0 | 2.0 | 99 |

That ethylorthoformate is ineffective in the absence of an alkanol is evident from comparison tests in which each mole of inosine was reacted with 6 moles acetone in the presence of six moles orthoformate and 5 moles hydrogen chloride. In the presence of six moles ethanol, the yields after 30 and 60 minutes were respectively 79 and 94 percent. In the absence of ethanol but under otherwise identical conditions, the corresponding yields were 24 and 26 percent.

Ethanol may be replaced by numerous aliphatic alcohols including alkoxy alkanols, such as the cellosolves, and phenols. For operation on an industrial scale, methanol and ethanol are preferred for economic reasons. About equal amounts of alcohol and acetone are preferably used.

For similar reasons, 2,2-diethoxy propane and 2,2-dimethoxy propane are preferred to other related compounds less readily or less inexpensively available. The higher homologs of dimethoxy and diethoxy propane are effective and even 2,2-diphenoxypropane can be used with good results.

Almost quantitative yields are rapidly achieved over a fairly wide range of catalyst and orthoformate ratios with respect to the ribonucleoside. The best results are generally obtained with two to five moles of orthoformate (or 2,2-dialkoxy-propane) per mole of nucleoside, with a fairly large excess of acetone, and with a catalyst concentration of at least 3 percent with respect to the acetone.

When an adequate amount of a 2,2-dialkoxypropane is present in the reaction mixture together with the ribonucleoside, the alcohol and the acid catalyst, the amount of acetone employed may be sharply reduced or no acetone at all need be added to the reaction mixture. While the reactions taking place are not entirely understood, it is believed that one or both of the following two types of reactions account for the facts observed.

Dialkoxypropanes are hydrolyzed to acetone in the presence of a strong acid:

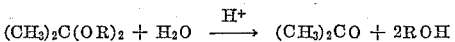

Dialkoxypropanes react directly with two alcoholic hydroxyl radicals of the nucleoside to form the isopropylidene nucleoside in the presence of the strong acid, that is, in the presence of hydrogen ions:

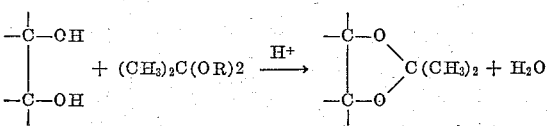

All ribonucleosides are capable of so reacting with the several 2,2-dialkoxypropanes referred to above. The yields obtained in the presence of an alcohol are excellent, and the reactions proceed at a very high rate at room temperature.

The 2',3'-O-isopropylidene ribonucleosides are readily isolated from the reaction mixtures by partial evaporation of the solvents in vacuo. The pH of the mixtures should be adjusted to a value between 7 and 9 prior to evaporation to avoid or minimize decomposition of the nucleosides. The 2',3'-O-isopropylidene ribonucleosides crystallize from the concentrated reaction mixtures.

Those skilled in the art will readily derive from the above tables specific process conditions under which the process of the invention may be performed to best advantage. The following detailed examples of specific embodiments of the invention may, therefore, be readily modified to suit particular reactants, proportions of reactants, catalysts, temperatures and the like. The invention is not limited to the specific illustrated examples.

EXAMPLE I 320 ml. ethanol containing 0.5 mole hydrogen chloride were mixed with 216 ml. acetone. 23 grams of dried inosine were suspended in the liquid mixture and stirred at room temperature. A clear solution was obtained within 5 minutes. Stirring was continued for a total period of 30 minutes whereupon the reaction mixture was poured into a dilute aqueous ammonium hydroxide solution. The alkalinity of the solution was adjusted to pH 8, and the adjusted solution was evaporated in a vacuum to 200 ml. Upon cooling, crystals of 2',3'-O-isopropylidene inosine were precipitated. They were filtered off and dried. Their weight was 20.8 grams (79% yield). The melting point was 278 degrees C., and was unchanged when the crystals obtained were mixed with 2',3'-O-isopropylidene inosine prepared by conventional methods. The elemental analysis of the crystals obtained was consistent with values calculated for 2',3'-O-isopropylidene inosine. The paper chromatogram of a solution of the product obtained in a mixture of butanol acetic acid, and water in a ratio of 4:1:5 was identical with that of the known compound. Additional 0.7 gram of 2',3'-O-isopropylidene inosine were obtained when the mother liquid from the original crystallization was concentrated further, and the solid material precipitated was thoroughly washed with water.

EXAMPLE II 8 grams of inosine were added to a mixture of 75 ml. acetone, 75 ml. ethanol, and 0.24 mole hydrogen chloride. The resulting mixture was then stirred for 10 minutes and poured into an aqueous solution of ammonium hydroxide. The alkalinity of the solution was adjusted to pH 8, and the volatile solvents were distilled off under reduced pressure. A crystalline precipitate formed upon cooling. It was filtered off, washed with water, and dried. The yield was 7.8 grams (80%) the melting point 278 degrees C., and the paper chromatogram developed as described in Example I showed only a single spot under ultra violet light.

EXAMPLE III 500 ml. ethanol containing two moles hydrogen chloride were combined with 500 ml. acetone, and 30 grams of guanosine were added with stirring to the combined solvents. Stirring at room temperature was continued for 30 minutes, and a substantially clear solution was obtained. It was poured into a sufficient amount of 10% aqueous ammonium hydroxide solution to make the pH of the resulting mixture 8–9. Ethanol and excess acetone were distilled off under reduced pressure until the volume of the residue was reduced to 200 ml. Upon cooling crystals of 2′,3′-O-isopropylidene guanosine were precipitated. The yield was 27.4 g. (80%). They were filtered off, washed with water, and dried. Their melting point was 296 degrees C. and the same melting point was obtained from a sample of the product mixed with 2′,3′-O-isopropylidene guanosine obtained by conventional methods. A paper chromatogram developed by the solvent mixture described in Example I showed only a single spot in ultraviolet light.

EXAMPLE IV 10 grams of adenosine were added to a mixture of 94 ml. acetone, 110 ml. ethanol and 0.2 mole hydrogen chloride. The resulting mixture was stirred for 10 minutes and poured into an aqueous solution of ammonium hydroxide. The solution was adjusted to pH 8, and the volatile solvents were distilled off under reduced pressure. Crystalline precipitates formed upon cooling were filtered off, washed with water and dried. The yield was 10.45 grams (91%), the melting point 216 degrees C., and the paper chromatogram developed as described in Example I showed only a single spot in ultra violet light.

EXAMPLE V

A mixture was prepared from 250 ml. ethanol, 252 ml. acetone, 525 ml. of an alcoholic hydrogen chloride solution containing 0.5 mole hydrogen chloride, 89 grams ethylorthoformate (0.6 mole), and 26.8 grams inosine (0.1 mole). The mixture was stirred. A clear solution was obtained in a few minutes, and contained 99% of the desired product after 30 minutes. Aqueous ammonium hydroxide was added to neutralize the reaction mixture, and the solvents were distilled off under reduced pressure. After concentration of the solution and cooling, there were obtained 26.3 grams of 2′,3′-O-isopropylidene inosine (85%). The melting point was 277 degrees C.

Calc. for $C_{13}H_{16}N_4O_5$: C, 50.6%; H, 5.2%; N, 18.2%. Found: C, 50.3%; H, 5.2%; N, 18.4%.

EXAMPLE VI

To a mixture of 250 ml. ethanol and 250 ml. acetone there were added 105 ml. ethanol containing 1 mole hydrogen chloride, 89 grams ethylorthoformate (0.6 mole) and 28.3 grams guanosine (0.1 mole) with stirring. After 20 minutes, the reaction mixture was poured into aqueous ammonium hydroxide solution and was thereby neutralized. Upon concentration of the resulting solution, gel-like 2′,3′-O-isopropylidene-guanosine precipitated. It was filtered off and recrystallized from water. The yield was 26 grams (81%), the melting point over 300 degrees C.

Calc. for $C_{13}H_{17}N_5O_6$: C, 48.3%; H, 5.3%; N, 21.7%. Found: C, 48.2%; H, 5.5%; N, 21.8%.

EXAMPLE VII

To a mixture of 250 ml. acetone and 250 ml. ethanol there were added 86 grams p-toluene sulfonic acid (0.5 mole), 89 grams ethylorthoformate (0.6 mole) and 26.7 grams adenosine (0.1 mole). The reaction mixture was stirred for 30 minutes, and then poured into aqueous ammonium hydroxide solution, whereby it was neutralized. Concentration of the solution gave 26.9 grams (88%) of 2′,3′-O-isopropylidene adenosine. The melting point after recrystallization from water was 216 degrees C.

Calc. for $C_{13}H_4N_5O_4$: C, 50.8%; H, 5.6%; N, 22.8%. Found: C, 51.1%; H, 5.9%; N, 22.6%.

EXAMPLE VIII

To a mixture of 20 ml. acetone and 20 ml. ethanol there were added 6.7 grams (45 millimoles) ethylorthoformate, 3.3 ml. alcohol containing 35 millimoles hydrogen chloride and 1.84 grams cytidine (7.6 millimoles). The reaction mixture was stirred for 6 hours. A clear solution was not obtained, but the crystals filtered off showed a single spot on a paper partition chromatogram (butanol:acetic acid 4:1) characteristic of 2′,3′-O-isopropylidene cytidine. The yield of crude material which contained about ½ mole hydrogen chloride per mole was 2.4 grams.

EXAMPLE IX

To a mixture of 50 ml. acetone and 50 ml. ethanol there were added 18.2 grams ethylorthoformate (0.12 mole), 7.1 grams of p-toluene sulfonic acid (41 millimoles) and 5 grams uridine (20.5 millimoles). The reaction mixture was stirred at room temperature for 15 minutes. It was then poured into ammonium hydroxide solution and was thereby neutralized. Concentration of the solution gave 5.83 grams 2′,3′-O-isopropylidene uridine which gave a single spot on a paper partition chromatogram (butanol:acetic acid). The melting point was 161.5 degrees C.

EXAMPLE X

To a mixture of 20 ml. ethanol and 20 ml. acetone there were added 3.0 grams 2,2-diethoxypropane, 0.68 gram hydrogen chloride in 4 ml. alcoholic solution and 1 gram adenosine. The reaction mixture was stirred 1 hour at room temperature, and the result solution was poured into aqueous ammonium hydroxide solution by which it was neutralized. Upon concentration of the solution in a vacuum, 1.0 gram 2′,3′-O-isopropylidene adenosine was obtained. The yield was 87% and the melting point of the crystals was 216 degrees C.

EXAMPLE XI

Five milliliters of ethanol containing 0.75 gram hydrogen chloride, 3.2 grams 2,2-diethoxypropane, and 1 gram uridine were added to 30 ml. ethanol and the mixture was stirred for 2 hours at room temperature. The reaction mixture was then poured into aqueous ammonium hydroxide solution and neutralized. The solution was evaporated to dryness under reduced pressure and the residue was repeatedly extracted with hot acetone. Evaporation of the combined extracts gave 1.05 grams 2′,3′-O-isopropylideneuridine (90% yield). The melting point of the crystals was 162 degrees C. The paper chromatogram of the crystals showed a single spot under ultraviolet light.

This application is a continuation-in-part of our co-pending application Serial No. 218,562, filed on August 22, 1962, now abandoned.

While the invention has been described with particular reference to specific embodiments, it is to be understood that it is not limited thereto but is to be construed broadly, and restricted solely by the scope of the appended claims.

What is claimed is:

1. A process for the prepartion of 2′,3′-O-isopropylidene purine ribonucleosides which comprises reacting a purine ribonucleoside with acetone in the presence of an alcohol and of a catalyst, said alcohol being a member of the group consisting of lower alkanol, lower alkoxy—(lower) alkanol, and phenyl—(lower) alkanol, and said catalyst being a strong acid.

2. A process as set forth in claim 1, wherein said purine ribonucleoside is seletced from the group consisting of guanosine, adenosine, and inosine.

3. A process as set forth in claim 1, wherein said catalyst is selected from the group consisting of inorganic and organosulfonic acids.

4. A process for the preparation of 2',3'-O-isopropylidene ribonucleosides which comprises dissolving a catalyst in an alcohol soluble in acetone to produce an alcoholic solution of said catalyst, and reacting a ribonucleoside with acetone in the presence of said alcoholic solution, said alcohol being a member of the group consisting of lower alkanol, lower alkoxy—(lower)alkanol, and phenyl—(lower) alkanol, and said catalyst being a strong acid.

5. A process for the production of 2',3'-O-isopropylidene ribonucleosides which comprises reacting a purine ribonucleoside with acetone in a homogeneous liquid phase essentially consisting of said acetone, an alcohol, and a catalyst, said alcohol being a member of the group consisting of lower alkanol, lower alkoxy—(lower) alkanol, and phenyl—(lower) alkanol, and said catalyst being a strong acid.

6. A process for the preparation of 2',3'-O-isopropylidene ribonucleosides which comprises reacting a ribonucleoside with acetone and a 2,2-dialkoxypropane in the presence of an alcohol and of a catalyst, said alcohol being a member of the group consisting of lower alkanol, lower alkoxy—(lower)alkanol, and phenyl—(lower) alkanol, and said catalyst being a strong acid.

7. A process as set forth in claim 6, wherein said ribonucleoside is selected from the group consisting of inosine, quanosine, adenosine, cytidine and uridene.

8. A process as set forth in claim 6, wherein said acid catalyst is selected from the group consisting of strong inorganic and organosulfonic acids.

9. A process for the preparation of 2',3'-O-isopropylidene ribonucleosides which comprise reacting a ribonucleoside with acetone in the presence of an alcohol, of a catalyst, and of an ester of orthoformic acid, said alcohol being a member of the group consisting of lower alkanol, lower alkoxy—(lower) alkanol, and phenyl—(lower) alkanol, and said caatalyst being a strong acid.

10. A process as set forth in claim 9, wherein said ribonucleoside is selected from the group consisting of inosine, quanosine, adenosine, cytidine, and uridine.

11. A process as set forth in claim 9, wherein said ester of orthoformic acid is a lower alkyl orthoformate.

12. A process as set forth in claim 9, wherein said acid catalyst is selected from the group consisting of strong inorganic and organosulfonic acids.

13. A process for the preparation of 2',3'-O-isopropylidene ribonucleosides which comprises reacting a ribonucleoside with a 2,2-dialkoxypropane in the presence of an alcohol and of a catalyst, said alcohol being a member of the group consisting of lower alkanol, lower alkoxy—(lower) alkanol, and phenyl—(lower) alkanol, and said catalyst being a strong acid.

14. A process as set forth in claim 13, wherein said ribonucleoside is selected from the group consisting of inosine, guanosine, adenosine, cytidine, and uridene.

15. A process as set forth in claim 13, wherein said acid catalyst is selected from the group consisting of strong inorganic and organosulfonic acids.

References Cited by the Examiner

UNITED STATES PATENTS 2,482,069  9/49  Ruskin _____ 260—211.5
2,938,900  5/60  Walton _____ 260—210

LEWIS GOTTS, Primary Examiner.